Sept. 15, 1964   M. N. HIRSH ETAL   3,149,276
ROTATION MEASURING DEVICE
Filed Sept. 26, 1961   3 Sheets-Sheet 1

INVENTORS.
MERLE N. HIRSH
BY PHILIP N. EISNER

ATTORNEY

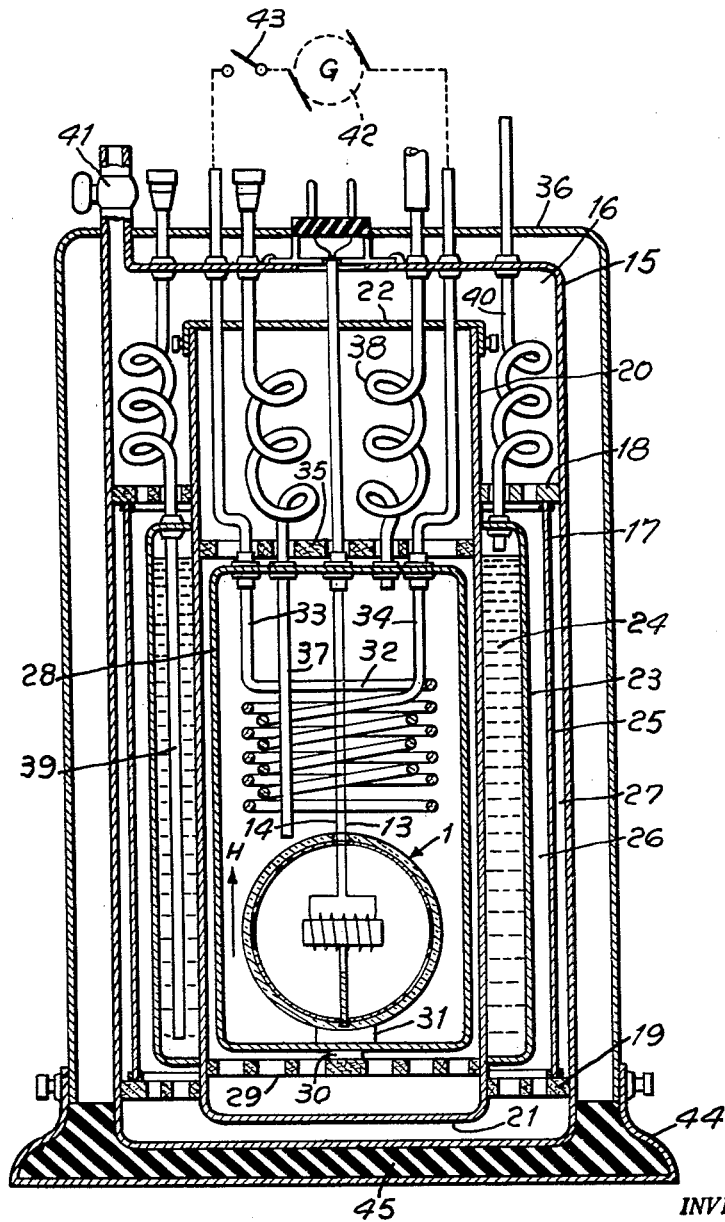

S CURVE AT OUTPUT OF PHASE COMPARATOR

INVENTORS.
MERLE N. HIRSH
PHILIP N. EISNER
BY
ATTORNEY

United States Patent Office 3,149,276
Patented Sept. 15, 1964

3,149,276
ROTATION MEASURING DEVICE
Merle N. Hirsh, Fords, N.J., and Philip N. Eisner, New York, N.Y., assignors to International Telephone and Telegraph Corporation, Nutley, N.J., a corporation of Maryland
Filed Sept. 26, 1961, Ser. No. 140,920
9 Claims. (Cl. 324—.5)

This invention relates to a device for measuring rotation and more particularly to a device for measuring rotation of an object, for example, a moving vehicle, with relation to a fixed axis in space.

Although mechanical gyroscopes are widely used to measure rotation, their inherent friction has limited their accuracy so they are not fully satisfactory where the accuracy requirements are very high, such as in inertial guidance of aircraft or in space vehicles. Other types of gyroscopes have been proposed but their accuracy is also limited by the sensitivity of the sensing means utilized therein.

It is an object of this inveniton to provide a highly sensitive rotation measuring device which is free of mechanical friction.

It is another object to provide a gyroscope having an extremely sensitive sensing means wherein rotations of $10^{-6}$ radians and better can be measured.

In carrying out the present invention, use is made of the fact that under proper conditions, the center frequency of the spectral lines of certain bodies varies with changes in the angular relationship of axes of these bodies with respect to a permeating magnetic field. One set of such conditions involves the inducement of atomic transitions in such bodies, for example by the application thereto of electromagnetic wave energy whereby the bodies display atomic resonances having predetermined frequency spectra with the center frequency of the spectral lines thereof shifting in accordance with the angular relationship of the axes of these bodies with respect to the permeating magnetic field. These bodies are preferably anisotropic crystals. The variation in these center frequencies is used to determine rotation of the crystal with respect to the magnetic field.

In accordance with a further aspect of the present invention, a magnetic field is provided whose field vector is fixed in inertial space.

According to still another aspect of the present invention, this fixed field is produced by causing a current to circulate on a conductor in the condition of superconductivity, which conductor may be principally of spherical configuration and having a thickness which permits the magnetic field to penetrate within the sphere. When a body of the type described above having transitions induced therein is mounted in a fixed position relative to the conductor, the current will flow in a given direction despite rotations of the conductor and the field vector of the magnetic field produced by this current flow will not change its direction. However, since the angular relationship between this fixed field and the body mounted in a fixed relation to the conductor will vary, the center frequency of the resonances of this body will be shifted in accordance with angular displacements of the axes of this body with respect to the fixed magnetic field vector and thus by measuring the center frequencies, the rotation of the sphere with respect to inertial space is determined.

The above-mentioned and other objects and features of this invention and the manner of attaining them will become more apparent by reference to the following description taken in conjunction with the accompanying drawings, in which:

FIG. 2 is a sectional view of the apparatus for cooling the gyroscope and for applying a magnetic field to the sphere;

Figure 1:
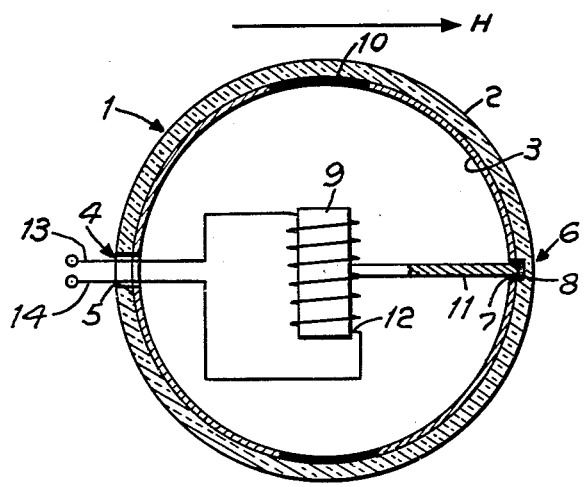
FIG. 1 is a sectional view of the gyroscope of this invention.

There is utilized in this invention a gyro which depends for its frictionless characteristics on the property known as superconductivity exhibited by certain metals and alloys at extremely low temperatures. The state of zero electrical resistance in many metals and alloys known as superconductivity is due to the appearance at very low temperatures of electrons endowed with the remarkable property of being able to travel through certain materials without the slightest trace of electrical friction. Such properties have been extensively investigated at temperatures as low as on the order of 1° K. obtained by boiling liquid helium, for example, in a cryostat.

The gyro of this invention utilizes a circulating electrical current that is induced and maintained in a material held at a superconducting temperature where no trace whatsoever of electrical resistance to the circulation of this current is present. The electrons in this orbital current possess an angular momentum that is infinitely high as compared to the definitely zero frictional forces acting on the current flow. The flow thus exhibits a high gyroscopic effect completely undisturbed by the frictional effects, such as are always present in mechanical gyros. The superconducting material is formed in the shape of a sphere or a spherical shell truncated at the poles so that the current that is induced in the sphere will, at all times that the superconductive condition is held, maintain the plane in which it was started and thus be used as the fixed reference in inertial space. However, to detect rotations of the gyro with an extremely high degree of accuracy, it is proposed to use sensing means of paramagnetic material and preferably paramagnetic material having anisotropic characteristics.

Nuclei of paramagnetic materials posses proton or nuclear magnetic moments and if these nuclei are subjected to a steady state magnetic flux field the magnetic moments of the nuclei will orient in the direction parallel to the flux field. If the substances are then subjected to a magnetic force couple produced by a high frequency magnetic field directed at right angles to the steady state flux field, a precession of their nuclei takes place similar in manner to the precession of a gyroscope. This precession may be converted into a signal by placing a pickup or receiver coil at right angles to both the steady state flux field and the driving high frequency field. The frequency of the precession signal is always equal to the frequency of the driving magnetic force couple produced by the high frequency magnetic field, but the amplitude of the precession signal is a quantity determined by the material, the magnitude of the steady flux field intercepting the substance and the frequency and amplitude of the driving high frequency flux field. If, for example, the driving field frequency were varied while maintaining the steady flux field at a constant value, a resonance condition would be observed in the magnitude of the nuclear precession signal at a given driving frequency. If the flux field were then placed at a second constant value and the driving frequency once again varied, another resonance condition of precession magnitude would be observed but at a different driving frequency than that observed in the first instance. This resonant frequency of the nuclear magnetic moments, termed the Larmor precession resonant frequency, has been determined to be directly proportional to the magnitude of the steady state flux field and this proportionality is observable over a wide range of flux magnitudes.

Another resonant precession phenomenon similar to the nuclear induction noted above, is obtainable by utilizing the electron or atomic shell magnetic moments of a paramagnetic substance. The production of this atomic shell resonance is effected in the identical manner noted above, except that the steady flux field necessary to observe the precession of the electron moments is of the order of only one thousandth as much as needed for a comparable coupling undergoing nuclear induction for the same energy difference in the resonance transition. Another difference between atomic and nuclear induction is that the resonant frequency of atomic induction will possess substantially a million times greater signal-to-noise ratio than nuclear induction for a comparable sample. This much smaller flux field and greater signal-to-noise ratio makes the utilization of electron resonance much more attractive than nuclear resonance in many applications serving to correlate the resonant precession frequency to flux magnitudes.

The resonant precession frequency of a paramagnetic substance regardless of whether its nuclear or atomic magnetic moment is used for obtaining resonance is an extremely stable one for any steady state constant flux value since it is determined by the substantially invariant qualities and characteristics of nuclear and atomic structure. Inasmuch as it is possible to obtain a flux field directly proportional to the current passing through a coil, it is clear that by utilizing the principle of Larmor precession one may obtain a frequency exactly proportional to a given current or voltage.

Nuclear and other paramagnetic resonances have been observed in the past. In general, a sample exhibiting paramagnetic properties is placed in a constant magnetic field that is substantially homogeneous within the sample. A radio frequency activated coil at right angles to the constant magnetic field generates an alternating magnetic field in the sample. The frequency of the alternating magnetic field is selected equal to the resonance precession frequency of the paramagnetic particles in the constant field. The resonance may be observed in one of the following ways: (1) as a result of the absorption or dispersion of the alternating magnetic field; (2) as a result of the voltage at the precession frequency induced in a coil at right angles to both the constant magnetic field and the axis of the alternating field inducing coils; or (3) by modulating either or both of the magnetic fields and detecting the effects of the modulation in accordance with either of the first two methods above.

The present invention makes use of the resonance curve characteristic of an anisotropic paramagnetic crystal for controlling a stabilized oscillator (usually a crystal oscillator) which, in turn, determines the frequency of the irradiating microwave energy. This control is accomplished by, in effect, frequency modulating the microwave energy at a low frequency about the resonance frequency. Thus, the low frequency oscillations applied to the coil around the anisotropic crystal are either absorbed or not absorbed and provide a signal which varies in sense and magnitude as the microwave energy shifts to one or the other side of the resonance frequency within the resonance curve. This signal is applied to a phase comparator where the phase of the output low frequency oscillations is compared with that of the input low frequency oscillations. The phase comparator develops an error signal proportional to the frequency difference between the resonance frequency and the frequency of the microwave energy, which error signal is applied to a frequency control circuit for adjusting the crystal oscillator so that the frequency of the microwave energy is locked to the resonance frequency.

For accuracy and stability, the resonant anisotropic crystal must meet at least two requirements. The first requirement is that the center or resonance frequency of the crystal should be substantially independent of variations in external factors, such as temperature and pressure. The second requirement is that the width of the resonance curve or line, i.e., the bandwidth, should be as narrow as possible. There are many anisotropic paramagnetic resonant materials. While any of the materials may be used as the crystal of the present invention, best results are obtained with those having a narrow resonance curve. Diphenyl picryl hydrazyl (DPPH) is typical of the class and will be used for purposes of illustration.

Diphenyl picryl hydrazyl exhibits an anisotropic $g$ factor, the $g$ factor being the constant in the equation for the paramagnetic resonance which varies with angle:

$$f_r = \frac{g \cdot \mu \cdot H}{h}$$

where $f_r$ is the resonant frequency, $\mu$ is the magnetic permeability, H is the field strength and $h$ is Planck's constant. The magnetic permeability is a constant and the field strength which is established is constant. The only variable then is the G factor which varies with angle. Diphenyl picryl hydrazyl is one of the class of materials known as an organic free radical, that is, it is a large organic molecule with an unused bond trapped in the molecule. The bond is paramagnetic, and the material is highly stable with a very narrow resonance line which gives good resolution. Since the molecule is long, the crystal itself is anisotropic. The geometrical difference of the anisotropicity causes different G factors in different crystalline directions. A crystal will absorb no energy until a particular frequency is reached, which is the frequency of paramagnetic resonance. However, energy is not absorbed at exactly one frequency, but is spread in the typically gaussian shape. In the case of DPPH, the frequency is somewhere around 30 megacycles for a magnetic field of 10 gauss. The effective change in the direction of the magnetic field with respect to the crystal or vice versa is to shift the resonant frequency to either a higher or lower position on the graph.

Referring now to FIGURE 1, there is shown the gyroscope 1 of this invention. On the inside surface of a quartz spherical shell 2 is deposited a layer 3 (shown exaggerated for purpose of illustration) of lead or other superconductive material having a thickness of 50 angstroms. At one pole 4 of the sphere a hole 5 is provided through the quartz shell 2 and the lead layer 3. At the oppositely disposed pole 6 there is a hole 7 through the lead layer 3 and a counterbore 8 in the quartz shell 2. A DPPH crystal 9 is disposed at the center of the sphere 2 with the anisotropic long axis thereof perpendicular to the field H of a current loop 10 which is induced in the superconductive lead layer 3 as will be hereafter described. The crystal 9 is rigidly supported by a rod 11 attached at the opposite end to the spherical shell 2 in the counterbore 8.

It is known that the depth of penetration of a magnetic field in a superconductor is very small. A current established in a superconductor has to flow in its surface because it follows from ordinary electrodynamics, that a magnetic field cannot penetrate into the superconductor. However, it has been shown that a magnetic field will exist in a superconductive layer of the thickness of 50 angstroms where the superconductor is in the shape essentially of a ring instead of a complete sphere. By having a superconductive truncated spherical shell 3, there is produced a body where the magnetic field will exist through the sphere when it is cooled to the superconductive state. However, before it is cooled to the superconductive state, the magnetic field must be applied above the superconductive threshold and then the temperature is rapidly brought down to the superconductive threshold and the field is then shut off. As stated above, one suitable way of attaining such a thin layer of superconductive material is by evaporating lead on the inside surface of the sphere 2. There are other materials which can be used besides lead. Lead has the advantage that it is cheap, easy to evaporate and that the superconducting transition temperature is quite high, being above the normal boiling point of liquid helium. A radio frequency coil 12 is disposed about the crystal 9 to produce a second magnetic field at right angles to the magnetic field of the superconductive current loop to provide the paramagnetic resonant frequency of the crystal. The leads 13 and 14 of the loop are brought out through the hole 4 for connection to other units that will be described later.

With reference to FIGURE 2, there is shown a cryostat containing the preferred embodiment of this invention. The outside case 15 of the cryostat may be made of any rust resistant metal, is in a substantially cylindrical form and provides the outer wall of a vacuum chamber 16 which serves to thermally insulate the elements inside. Concentric with the outside case 15 and inside thereof is a radiation shield 17 which may be made of any highly polished metal. This shield is held in place by two dielectric rings 18 and 19. A cylindrical vessel 20 having a base 21 and a top cover 22 is supported by the dielectric rings 18 and 19. Surrounding the cylindrical vessel 20 is another cylindrical vessel 23 with a space 24 which is filled with liquid nitrogen. A cylindrical wall 25 is disposed between the cylindrical vessel 23 and the cylindrical wall 15 and creates two vacuum spaces 26 and 27 for insulation purposes. Inside of the cylindrical vessel 20 is a cylindrical vessel 28 which is closed at the top and bottom and is supported within the cylindrical vessel 20 by a dielectric disc 29 and spaced therefrom by a spacer 30. The gyroscope 1 of this invention is mounted within the cylindrical vessel 28 and is supported from the bottom surface thereof by a base member 31. Disposed above the gyroscope is a coil 32 of heavy copper located in the correct position to induce a current in the superconductive lead layer 3, and leads 33 and 34 sealed in the top of the container 28 are passed therethrough and through a dielectric supporting member 35, through the top members of containers 20 and 15 and through a magnetic shield 36 which surrounds the whole assembly. The magnetic shield 36 serves to shield the gyroscope 1 with its magnetic field from the influence of outside magnetic fields and more particularly from the influence of the earth's magnetic field. Inside the container 28 there is introduced liquid helium through filler tube 37 and a vent tube 38. Similarly, the container 23 includes a filler tube 39 and a vent tube 40 for the liquid nitrogen. A vacuum connection 41 is provided for exhausting the vacuum spaces within the assembly. The leads 33 and 34 of the coil 32 are connected to a generator 42 via a switch 43. The magnetic shield 36 is connected to the base 44 also of magnetic material wherein is disposed heat insulating material 45.

Figure 3:
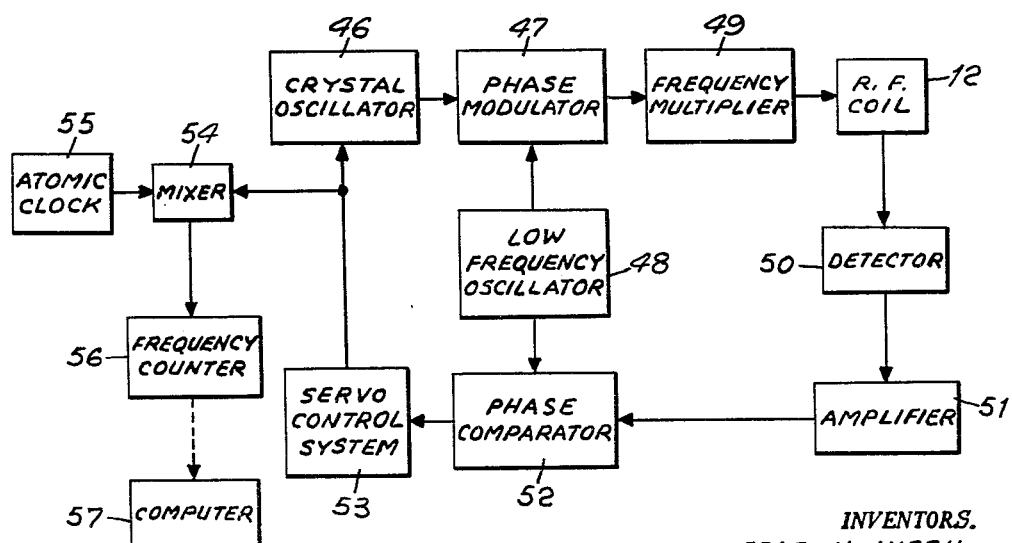
FIG. 3 is a block diagram of the circuit for use with the gyroscope of the present invention.

Turning now to FIG. 3, a static magnetic field is provided having magnetic lines of force parallel to the dipole moment of the anisotropic crystal and perpendicular to the magnetic field of the microwave energy which is used to radiate the crystal as is pointed out hereinafter. The output of a crystal oscillator 46 is phase modulated in a phase modulator 47 with the output of a low frequency oscillator 48. The crystal oscillator 46 should have a stability of one part in $10^6$. The oscillator output is multiplied to the resonance frequency of the DPPH crystal in the frequency multiplier 49. The resultant frequency modulated microwave signal is then applied to the radio frequency coil 12 surrounding the anisotropic crystal via suitable waveguiding means, such as a coaxial line. The energy absorbed by the crystal is detected by the detector 50 whose output is amplified by an amplifier 51, the corresponding output being applied to a phase comparator 52 which may be in the form of a synchronous detector. In the phase comparator 52 the output of the amplifier 51 is compared with a reference signal from the low frequency oscillator 48. The output of the phase comparator 52 whose amplitude and polarity vary in accordance with the difference between the center frequency of the paramagnetic resonance and the frequency of the microwave energy applied to the crystal 9 is applied to a servo control system 53. The servo control system 53 adjusts the frequency of the crystal oscillator 52, as, for instance, by varying an inductance in the crystal oscillator circuit. The adjustment provides relatively small changes in the frequency of the crystal oscillator. By this means, the output frequency of the crystal oscillator is locked to the resonant frequency of the crystal 9.

At the same time the frequency of crystal oscillator 46 is fed into a mixer 54 and the stable output from an atomic clock 55 is also fed into a mixer. A frequency counter 56 takes the output of the mixer 54 and determines the change in frequency between the crystal oscillator 46 and the atomic clock 55. The difference in frequency can be calibrated to provide a direct indication of the precession of the crystal in the magnetic field which will be an indication of the change in angle of the vehicle in which the rotation measuring device is mounted. The output of the frequency counter 56 can be used either directly in correcting the attitude of the vehicle or it can be fed into a computer 57 where other use of the information may be made.

Figure 4:
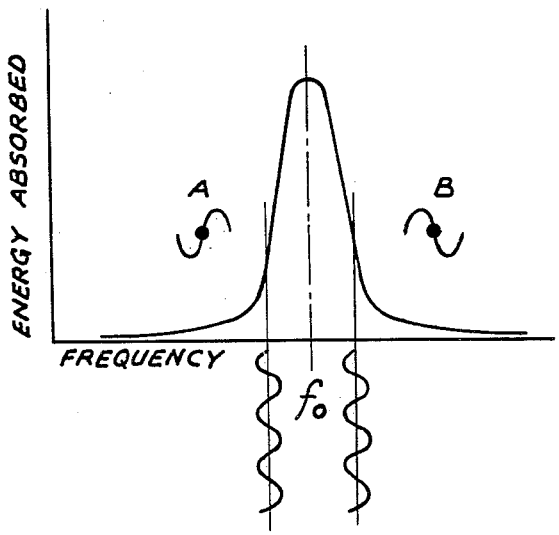
FIG. 4 is an atomic resonance curve of an anisotropic crystal showing the effects of low frequency modulations and the resultant detected signals.

The low frequency oscillator 48 is employed to vary the frequency of the microwave energy back and forth over a small portion of the resonant frequency curve as illustrated in FIG. 4. FIG. 4 illustrates a Lorentzian resonance curve showing the resonance line $f_0$ and the bandwidth $\Delta f$ which occurs at the half power point. The curve of FIG. 4 shows how the absorption of microwave energy varies as the microwave energy irradiating the anisotropic crystal varies in frequency. The oscillations of the low frequency oscillator are shown as occurring on either side of the resonance line $f_0$, and the corresponding outputs are shown as waveforms A and B. As the microwave energy applied to crystal is varied on either side of the resonance line $f_0$, the energy absorption varies according to a characteristic low frequency sine wave of the same frequency as the frequency of the oscillator 48. If the frequency of the crystal oscillator is equal to the resonance line $f_0$, the absorption by the crystal is a maximum. If the frequency is on either side of $f_0$, an output will be obtained from the crystal in the form of a low frequency wave. When the crystal oscillator frequency is on one side of $f_0$, the phase of this low frequency wave will be 180° out of phase with the low frequency wave produced when the crystal oscillator frequency is on the other side of $f_0$. In the phase comparator 52 this low frequency wave is compared with the reference low frequency wave from the low frequency oscillator 48 and the output thereof provides a control voltage for the servo control system.

Figure 5:
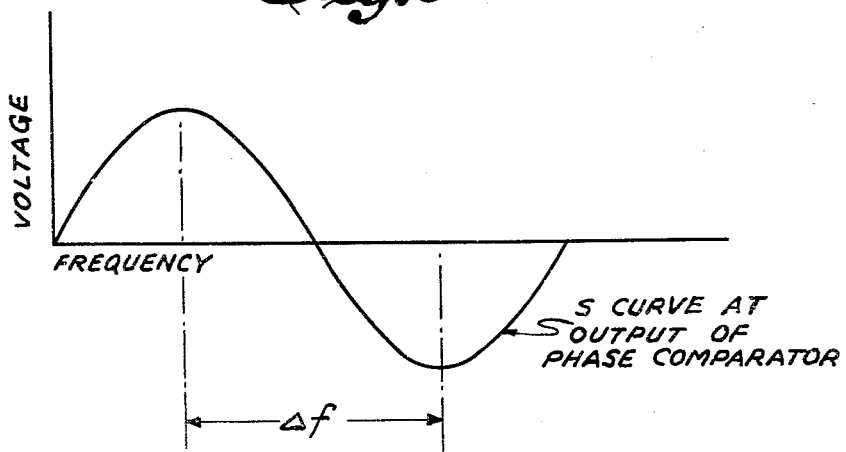
FIG. 5 is an S curve showing the relationship of the frequency to the output of the phase comparator used in controlling the crystal oscillator.

FIG. 5 illustrates an error curve, or S curve, representing the resulting error voltage which appears at the output of the phase comparator 52. This error voltage is fed back in proper phase to the servo control system 53 whereby the crystal oscillator 46 is locked to the center or paramagnetic resonance frequency $f_0$.

In operation, a circulating current of about five amperes is set up in the superconductive sphere 3 to provide a field of 10 gauss at the center of the sphere. The current has a net angular momentum $\vec{J}$, and a consequent magnetic moment $\vec{M}$, $\vec{J}$, and $\vec{M}$ remaining fixed in inertial space under rotations of the sphere. It has been stated above that the DPPH crystal 9 placed at the center of the sphere is an organic free radical having a very strong paramagnetic resonance line of 2 gauss half width. The radical further shows anisotropy in its resonant frequency, the splitting factor varying from 2.0035 with its crystal axis parallel to the field, to 2.0048 with the external field perpendicular to the axis, a maximum change of about .04% in frequency with orientation in a given magnetic field. With the crystal 9 rigidly fixed in position at the center of the sphere and the sphere firmly attached to a vehicle, and with $\vec{J}$ and $\vec{M}$ stationary in absolute space, then a rotation of $\pi/2$ radians will shift the resonant absorption frequency of the DPPH by 12,000 c.p.s. at about 30 mc., a change of four parts in $10^4$. Hence, a rotation of $10^{-6}$ radians changes the resonant frequency by one part in $10^{10}$.

It will be shown that the circulating current in the superconductive state will not be degraded by loss of energy due to the constant realignment of spins of the DPPH crystal; that is, the rotation of the paramagnetic salt in the magnetic field changes the flux induced by the circulating current thus inducing a counter electromotive force in the superconducting sphere, which, in turn, changes the circulating current. Since the magnetic field due to this current is parallel to the dipole moment of the DPPH, no torques can be exerted by the DPPH on the current loop; hence, no rotations will be induced. If the number of spins (size of sample) of the DPPH crystal in the sphere is $10^{12}$, an "instantaneous" change in relative position of the spins and circulating current of 90° changes the energy of the spin system by:

$$\Delta E = \tfrac{1}{2} N \mu (\Delta g) H$$

where $N=10^{12}$, $\mu=10^{-20}$ erg/gauss, $\Delta g=4\times 10^{-4}$ and $H=10$ gauss.

Hence, $$\Delta E = 10^{12} \times 2 \times 10^{-4} \times 10 = 2 \times 10^{-11} \text{ erg}$$
$$E = \tfrac{1}{2} N \mu \ gh$$
$$= 10^{-7} \text{ erg.}$$

The current must now change its magnitude in order to decrease its own contribution to the energy stored in the field inside the sphere. Since the energy stored in the magnetic field is $$E = \frac{1}{8\pi} H^2$$

and if integration over all space is ignored and only the energy per unit volume in the neighborhood of the DPPH is examined, then $$\Delta E = \frac{1}{4\pi} H \Delta H$$

$$\Delta H = \frac{4\pi \Delta E}{H}$$

The frequency shift $\Delta f$ of the DPPH resonance is then:

$$\Delta f = \frac{2\mu}{h} (g \Delta H + H \Delta g)$$

$$= \frac{2 \times 10^{-20}}{6.6 \times 10^{-27}} (2 \times 4\pi \times 2 \times 10^{-11} + 10 \times 4 \times 10^{-4})$$

$$= \frac{2}{6.6} \times 10^7 (16\pi \times 10^{-12} + 4 \times 10^{-3})$$

$$\cong 12 \text{ kc./s}$$

That is, the frequency shift is due almost entirely to the term involving $\Delta g$ and is in fact a factor $10^9$ times greater than the term arising from the current perturbation.

The small computer function generator 57 could be designed to directly transpose the frequency difference of the angle into a direct reading of the angle. However, in any type of guidance unit the information that is important is the signal which carries the angle intelligence. The signal itself can be used to correct the aircraft or missile or other vehicle which is being guided, and thus it may never, as a matter of practice, be necessary to bring out the angle on a recorder or meter. The signal may merely be used in a larger servomechanism for other purposes. It is seen that this signal with this type of information does not distinguish any of the three angular differences along the three axes in space and so the device indicates a frequency versus angular change in only one direction in space. To provide information of rotation about the other axes, other similar gyroscopes oriented about the other axes are required.

While we have described above the principles of our invention in connection with specific apparatus, it is to be clearly understood that this description is made only by way of example and not as a limitation to the scope of our invention as set forth in the objects thereof and in the accompanying claims.

We claim:

1. A device for measuring rotation comprising a truncated spherical shell of superconductive material, means to produce a current flow in a fixed plane in said superconductive material to provide a magnetic field having a given orientation in inertial space, means to reduce the temperature of said shell to the superconductive state whereby said current flow and said magnetic field are maintained in a lossless condition after said means to produce said current flow is switched off, an anisotropic paramagnetic element mounted to said shell and disposed in said magnetic field for free rotation with respect thereto and having a frequency response characteristic varying with the orientation of a given axis of said element with respect to the direction of said magnetic field, and means to detect the response of said element to said magnetic field.

2. A device for measuring rotation according to claim 1 wherein said superconductive material is of a thickness which permits the magnetic field to penetrate into said material and within the sphere.

3. A device for measuring rotation comprising a truncated spherical shell of superconductive material, means to produce a current flow in a fixed plane in said superconductive material to provide a magnetic field having a given orientation in inertial space, means to reduce the temperature of said shell to the superconductive state whereby said current flow and said magnetic field is maintained in a lossless condition after said means to produce said current flow is switched off, an anisotropic paramagnetic element mounted to said shell and disposed in said magnetic field for free rotation with respect thereto and having a frequency characteristic varying with the orientation of a given axis of said element with respect to the direction of said field, means for applying high frequency electromagnetic energy of a given frequency to said element to produce said frequency response in said element, and means to detect the response of said element to said magnetic field.

4. A device for measuring rotation comprising a truncated spherical shell of superconductive material, means to produce a current flow in a fixed plane in said superconductive material to provide a magnetic field having a given orientation in inertial space, means to reduce the temperature of said shell to the superconductive state whereby said current flow and said magnetic field are maintained in a lossless condition after said means to produce said current flow is switched off, an anisotropic paramagnetic element mounted to said shell and disposed in said magnetic field for free rotation with respect thereto and having a resonant frequency varying with the orientation of a given axis of said element with respect to the direction of said field, a variable source of high frequency energy, means to modulate said high frequency energy with low frequency oscillations, means to apply said modulated high frequency energy to said element orthogonal to said current flow to produce said resonant frequency in said element, means to detect said modulating signal and means to determine any phase shift occurring in said modulating signal denoting any shift in the resonant frequency of said element indicative of a change in the orientation of said element relative to the direction of said field.

5. A device for measuring rotation comprising a truncated spherical shell of superconductive material, means to produce a current flow in a fixed plane in said superconductive material to provide a magnetic field having a given orientation in inertial space, means to reduce the temperature of said shell to the superconductive state whereby said current flow and said magnetic field are maintained in a lossless condition after said means to produce said current flow is switched off, an anisotropic paramagnetic element mounted to said shell and disposed in said magnetic field for free rotation with respect thereto and having a resonant frequency varying with the orientation of a given axis of said element with respect to the direction of said field, a variable source of high frequency energy, means to modulate said high frequency energy with low frequency oscillations, means to apply said modulated high frequency energy to said element orthogonal to said current flow to produce said resonant frequency in said element, means to detect said modulating signal and means to determine any phase shift occurring in said modulating signal denoting any shift in the resonant frequency of said element indicative of a change in the orientation of said element relative to the direction of said field, and means coupled to the output of said means to determine said phase shift to change the frequency of said source of high frequency energy.

6. A device for measuring rotation comprising a spherical shell, a film of superconductive material disposed on the inside surface of spherical shell in the form of a truncated sphere, means to produce a current flow in a fixed plane in said superconductive material to provide a magnetic field having a given orientation in inertial space, means to reduce the temperature of said film to the superconductive state whereby said current flow and said magnetic field are maintained in a lossless condition after said means to produce said current flow is switched off, an anisotropic paramagnetic element mounted inside said shell for free rotation with respect to said magnetic field and having a frequency characteristic varying with the orientation of a given axis of said element with the direction of said field, means for applying high frequency electromagnetic energy of a given frequency to said element to produce said frequency response in said element and means to detect the response of said element to said magnetic field.

7. A device for measuring rotation comprising a ring of superconducting material, means to produce a lossless circulating current on said ring whereby the magnetic field associated with said current is used as a fiducial direction in space, a crystal of an organic free radical fixedly mounted to said ring within said magnetic field, said crystal exhibiting paramagnetic resonance at particular frequencies and being responsive to the motion of said ring and said crystal with respect to said fiducial direction, and means coupled to said crystal to compare changes in the resonant frequency of said crystal as a measure of the change in the orientation of said crystal with respect to said magnetic field.

8. A device for measuring rotation comprising a ring composed of material which is superconductive at reduced temperatures, means to apply an electric current in said material in a fixed plane and to maintain the associated magnetic field across said ring during the time said ring is cooled below its superconductivity transition temperature, a paramagnetic resonant crystal disposed within said ring in fixed relation thereto and to the direction of said magnetic field and free to rotate with respect to the electric current in said superconducting ring, means to apply microwave energy at the crystal resonant frequency to said crystal, means to detect the variation and absorption of said energy by said crystal as said crystal precesses relative to said magnetic field, means to vary the frequency of said microwave energy applied to said coil as the resonant frequency of said crystal changes due to rotation of said ring, and means to compare the change in frequency applied to said crystal whereby the change in frequency is a measure of the degree of the rotation of said crystal.

9. A device as in claim 4 wherein said anisotropic crystal is composed of diphenyl picryl hydrazyl.

References Cited in the file of this patent
UNITED STATES PATENTS

| | | |
|---|---|---|
| 2,704,431 | Steele | Mar. 22, 1955 |
| 2,820,944 | Bradley | Jan. 21, 1958 |
| 2,841,760 | Hansen | July 1, 1958 |
| 2,871,703 | Walker | Feb. 3, 1959 |

OTHER REFERENCES

Autler: The Review of Scientific Instruments, vol. 31, No. 4, Apr. 1960, pp. 369–373.

Garstens: Physical Review, vol. 96, No. 1, Oct. 1, 1954, pp. 53–56 incl.

Shulman: Physical Review, vol. 121, No. 1, Jan. 1, 1961, pp. 125–143 incl.

Volkoff et al.: Canadian Journal of Physics, vol 30, No. 3, 1952, pp. 270–289 incl.